Patented Nov. 6, 1945

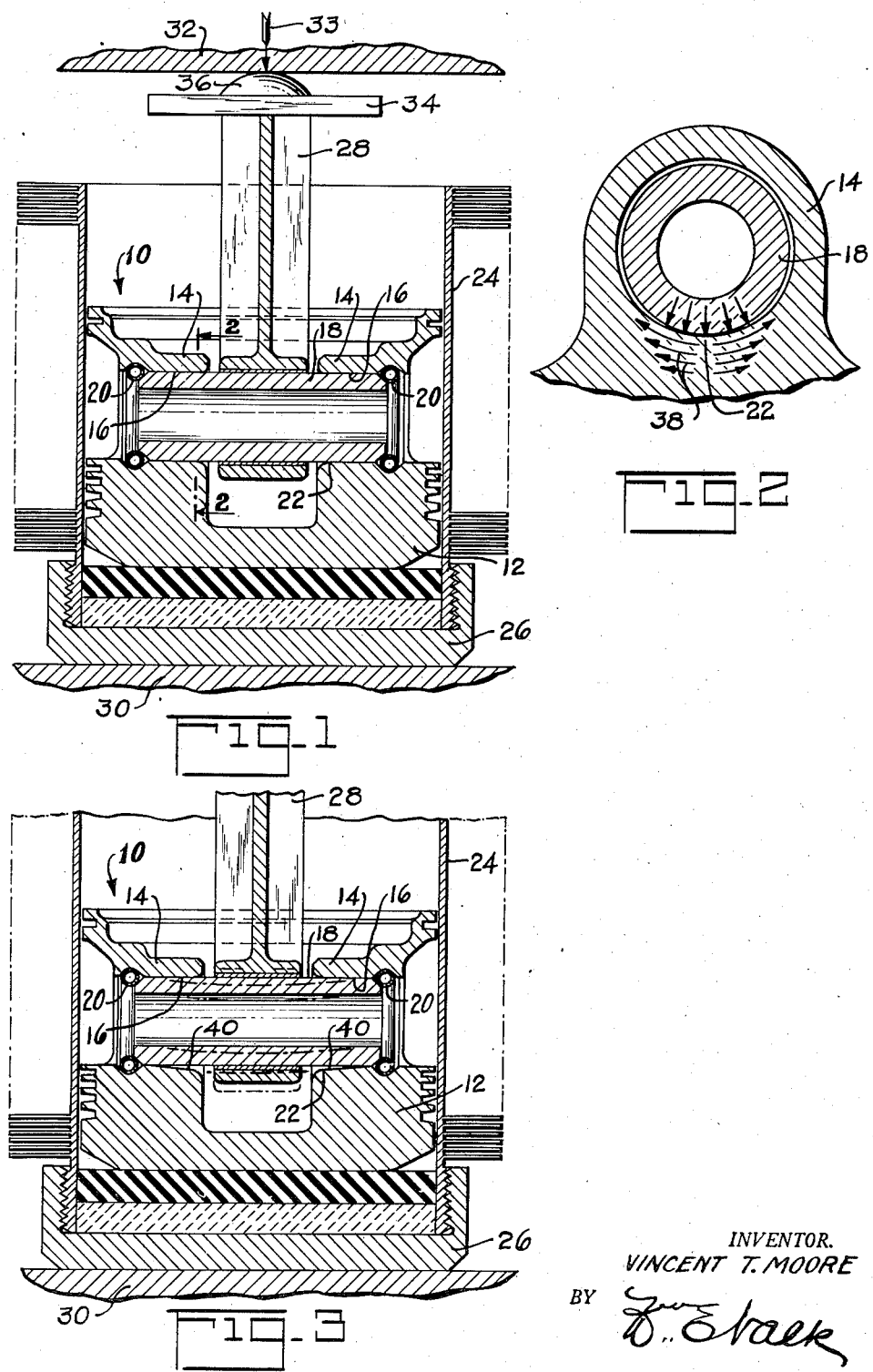

2,388,363

UNITED STATES PATENT OFFICE 2,388,363

PISTON

Vincent T. Moore, Glen Rock, N. J., assignor to Wright Aeronautical Corporation, a corporation of New York Application February 23, 1944, Serial No. 523,772

10 Claims. (Cl. 309—19)

This invention relates to a piston construction and is more particularly concerned with a piston pin boss construction and with a method for strengthening such bosses.

The conventional piston for an internal combustion engine comprises a head portion having a pair of spaced bosses depending therefrom. These bosses are provided with co-axial bores for receiving a piston pin and about which a connecting rod is journalled between the bosses. With this conventional piston construction there is a high concentration of the piston load at the facing or inner ends of said bores, thereby tending to cause failure of the piston bosses. It is an object of this invention to provide for a more uniform distribution of the load along the piston pin. It is a further object of the invention to deform the piston head side of said co-axial bores to effect a more uniform distribution of the load therealong. Specifically, the invention comprises a piston in which the material of the piston bosses is permanently pre-stressed on the piston head side of the bores through said bosses, thereby reducing the maximum stresses induced in said material during engine operation.

Other objects of the invention will become apparent upon reading the annexed detailed description in connection with the drawing in which:

Fig. 1 is a sectional view through apparatus for pre-loading a piston in accordance with this invention, Fig. 2 is a schematic view illustrating the tensile stresses existing in a piston pin boss under load, and Fig. 3 is an enlarged view of the piston pin bosses after they have been pre-loaded.

Referring to the drawing, a conventional piston for an internal combustion engine is illustrated at 10 and comprises a head portion 12 having a pair of spaced bosses 14 depending therefrom. The bosses 14 are provided with co-axial bores 16 for the reception of a piston pin 18 which is held therein by spring ring retainers 20. During engine operation there is a high concentration of stress in the material of the bosses in the region 22 adjacent the inner edge of said bores and on their piston head side. Furthermore, the repeated loading imposed during engine operation tends to cause fatigue and cracking of the bosses in this highly stressed region 22.

In order to strengthen the piston pin bosses 14, the piston is supported within a suitable cylinder, as 24, which may be the conventional air cooled cylinder for an internal combustion engine. The cylinder 24 is provided with a cylinder head 26 in which a suitable yieldable material as oil, rubber, beeswax, etc. is disposed. As illustrated in the drawing, a layer of rubber and beeswax is found to be satisfactory. The piston to be strengthened is provided with a piston pin 18 or other suitable shaft disposed within and bridging the co-axial bores 16, and a portion of a connecting rod 28 is journalled thereabout between the bosses 14. The piston and connecting rod are supported on a base plate 30 of a suitable compression machine with the movable head 32 of the machine adapted to apply a load, indicated by the arrow 33, through a plate 34 having a spherical button 36 axially alined with the longitudinal axis of the connecting rod 28.

When the compression load 33 is applied to the connecting rod 28, this load is transmitted to the piston pin bosses through the piston pin 18 and this load induces a tensile stress in the material of these bosses tending to enlarge their bores 16, as illustrated by the tensile stress vectors 38 in Fig. 2. This tensile stress in the material of the bosses 14 is a maximum at the piston head or loaded side of the bores 16; that is, in the region indicated at 22. A sufficient load 33, for example 100,000 pounds, is applied to the connecting rod section 28 so as to load the material of the piston bosses 14 at their regions 22 of maximum stress beyond the elastic yield point of the material. That is, the load 33 is substantially greater than the normal peak operating loads imposed on the piston pins during engine operation such that in the region 22 the material of the piston pin bosses is plastically stretched. Under the load 33 the tensile stress in the material of the piston pin bosses 14 gradually decreases from a maximum value at the surface of the loaded side of the bores 16 toward the piston head and, therefore, only the material of the bosses 14 adjacent the piston head side of the bores 16 is plastically stretched.

As a result of this plastic deformation of the piston pin bosses adjacent the loaded side of their bores 16, when the static load 33 is removed the bore 16 will remain permanently deformed, as indicated at 40 in Fig. 3. The magnitude of this deformation has been greatly exaggerated in the drawing and may only have a maximum value of approximately .001". Furthermore, since the material of the piston pin bosses about the plastically deformed region 22 is subjected to a tensile stress, as a result of the load 33, which stress is under the elastic limit of the material, when the load 33 is removed, this material surrounding the region 22 will tend to shrink back to its original unstretched condition, and in so doing will impose a compression stress on the plastically deformed region 22. Therefore, when the load 33 is removed the piston pin bores 16 are not only permanently deformed as indicated in Fig. 3, but in addition, the material of the bosses 14 adjacent the piston head side of these bosses is put into compression. In other words, as to this latter result, the material of the piston pin bosses adjacent the loaded side of their piston pin bores is placed under an initial compression stress; that is, this material is pre-stressed in compression. As used in the specification and claims, the phrase "pre-stressed" is intended to mean that the material of the piston pin bosses is under stress when these bosses are subjected to no external loads, that is, the material of the piston-pin bosses in the region 22 is stressed in compression prior to operation in an engine.

With the loaded side of the bores 16 permanently deformed or tapered as illustrated in Fig. 3, there no longer is a high concentration of stress at the inner or facing edges of the surface of these bores during engine operation and instead the load is more uniformly distributed. Thus, during engine operation the piston pin 18 bends under load against the tapered sides of the bores 16 as indicated by the dotted lines in Fig. 3. Also, because of the pre-stressed compression condition of the material of the piston pin bosses adjacent the loaded side of the bores, the magnitude of the stress resulting from the tendency of the load, imposed thereon during engine operation, to stretch this material is considerably reduced. In other words, the permanent set of deformation of the loaded side of the bores 16 and the pre-stressed condition of the material of the piston pin bosses adjacent thereto mutually contribute to a reduction in the maximum stress existing in the piston pin bosses during engine operation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The method of strengthening a piston having a piston-pin boss with a bore for the reception of a piston pin, said method comprising the step of applying a force in a direction substantially normally to the axis of said bore and against the projecting portion of a pin extending within and from one end of said bore thereby urging said pin against one side of said bore, and then removing said force, said force having a magnitude such that the material of said boss adjacent said bore end and side is stressed beyond its elastic limit by said force and is pre-stressed in compression after said force is removed.

2. The method of strengthening a piston having a piston-pin boss with a bore for the reception of a piston pin, said method comprising the step of applying a force in a direction substantially normal to the axis of said bore and against a pin extending within and from said bore, and then removing said force, said force having a magnitude sufficient to stress a portion of the material of said piston-pin boss beyond its elastic limit but said force having a magnitude insufficient to fracture said piston-pin boss.

3. The method of strengthening a piston having a pair of spaced bosses with alined bores for the reception of a piston pin, said method comprising the step of applying a force substantially normal to the axis of said bores toward said piston head and against a pin extending within said bores, and then removing said force, said force having a magnitude such that the material of said bosses on the piston head side of said bores and adjacent the facing ends of said bores is stressed beyond its elastic limit by said force and is pre-stressed in compression after said force is removed.

4. The method of strengthening a piston having a pair of spaced piston-pin bosses with alined bores for the reception of a piston pin, said method comprising the step of applying a force between said bosses in a direction substantially normal to the axis of said bores toward said piston head and against a pin extending within said bores, and then removing said force, said force having a magnitude such that the material of said bosses on the piston head side of said bores and adjacent the facing ends of said bores is stressed beyond its elastic limit by said force.

5. A piston having a piston head and a pair of spaced bosses, said bosses having co-axial bores therethrough for the reception of a piston pin, said bores being cylindrical except for their piston head sides which are provided with a slight taper diverging toward their facing ends.

6. A piston having a piston-pin boss with a bore therein for the reception of a piston pin adapted to project from one end of said bore, said bore being cylindrical except for one side which diverges toward said end of said bore, the material of said boss adjacent said diverging portion being pre-stressed in compression.

7. A piston having a piston head and a piston-pin boss with a bore therein for the reception of a piston pin which is adapted to project from one end thereof, said bore being cylindrical except its piston head side which diverges toward said end of said bore, the material of said boss on the piston head side of said bore and adjacent said diverging portion being pre-stressed in compression.

8. A piston having a piston-pin boss with a bore for the reception of a piston pin, the material of said boss about said bore having physical characteristics similar to that resulting from a temporary application of a force in a direction substantially normal to the axis of said bore and against a pin extending within an end of said bore for urging said pin against a side of said bore, said force having a magnitude such that the material of said boss adjacent said bore side and end is stressed beyond its elastic limit by said force and such that upon removal of said force said material is pre-stressed in compression.

9. A piston having a piston head and a pair of spaced piston-pin bosses with alined bores for the reception of a piston pin, the material of said bosses about said bores having physical characteristics similar to that resulting from a temporary application of a force between said bosses in a direction toward said head and normal to the axis of said alined bores and against a pin extending within said bores, said force having a magnitude such that the material of said bosses on the piston head side of said bores and adjacent the facing ends of said bores is stressed beyond its elastic limit by said force and such that upon removal of said force said material is pre-stressed in compression.

10. A piston having a piston head and a pair of spaced piston pin bosses with alined bores for the reception of a piston pin, the material of said bosses about said bores having physical characteristics similar to that resulting from a temporary application of a force between said bosses in a direction toward said head and normal to the axis of said bores and against a pin extending within said bores, said force having a magnitude such that the material of said bosses on the piston head side of said bores and adjacent the facing ends of said bores is stressed beyond its elastic limit, but said force having a magnitude insufficient to fracture said bosses.

VINCENT T. MOORE.